United States Patent
Bergman

(10) Patent No.: US 10,580,273 B2
(45) Date of Patent: Mar. 3, 2020

(54) SHIELDED PEDESTAL WITH SEE-THRU CAPABILITY

(71) Applicant: Adam S. Bergman, Boca Raton, FL (US)

(72) Inventor: Adam S. Bergman, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/213,611

(22) Filed: Dec. 7, 2018

(65) Prior Publication Data

US 2019/0180587 A1    Jun. 13, 2019

Related U.S. Application Data

(60) Provisional application No. 62/596,163, filed on Dec. 8, 2017.

(51) Int. Cl.
| | |
|---|---|
| *G06K 15/00* | (2006.01) |
| *G08B 13/24* | (2006.01) |
| *G06F 3/147* | (2006.01) |
| *G06K 7/10* | (2006.01) |
| *G06F 3/14* | (2006.01) |
| *H04N 7/18* | (2006.01) |
| *H04N 5/247* | (2006.01) |

(52) U.S. Cl.
CPC ......... *G08B 13/2402* (2013.01); *G06F 3/147* (2013.01); *G06F 3/1446* (2013.01); *G06K 7/10366* (2013.01); *G08B 13/2474* (2013.01); *G08B 13/248* (2013.01); *G08B 13/2482* (2013.01); *H04N 5/247* (2013.01); *H04N 7/181* (2013.01)

(58) Field of Classification Search
CPC .................................................... G09F 3/0335
USPC ........................................ 235/375, 382, 383
See application file for complete search history.

(56) References Cited

U.S. PATENT DOCUMENTS

| | | | | |
|---|---|---|---|---|
| 2004/0000998 A1* | 1/2004 | Karp | ................... | G08B 13/2402 340/572.3 |
| 2012/0154151 A1* | 6/2012 | Kuhn | ..................... | B65D 51/30 340/572.1 |

(Continued)

FOREIGN PATENT DOCUMENTS

WO    97/16864 A1    5/1997

OTHER PUBLICATIONS

International Search Report and Written Opinion dated Feb. 27, 2019 and received in PCT/US2018/064537.

*Primary Examiner* — Jamara A Franklin
(74) *Attorney, Agent, or Firm* — Fox Rothschild LLP; Robert J. Sacco; Carol E. Thorstad-Forsyth

(57) ABSTRACT

Systems and methods for operating a pedestal of an Electronic Article Surveillance ("EAS") system. The methods comprise: performing tag detection operations by a circuit of a first pedestal to detect an active security tag located in an EAS detection zone of the EAS system; and performing open-look operations by the circuit of the first pedestal simultaneously with the tag detection operations, where the open-look operations cause a portion of the first pedestal that is formed of an opaque material (1) to appear at least partially transparent or (2) to appear as if the portion has at least one aperture formed therethrough.

20 Claims, 8 Drawing Sheets

(56) References Cited

U.S. PATENT DOCUMENTS

2014/0111338 A1    4/2014    Bergman et al.
2017/0221099 A1*  8/2017    Fernandez .............. H04W 4/70

* cited by examiner

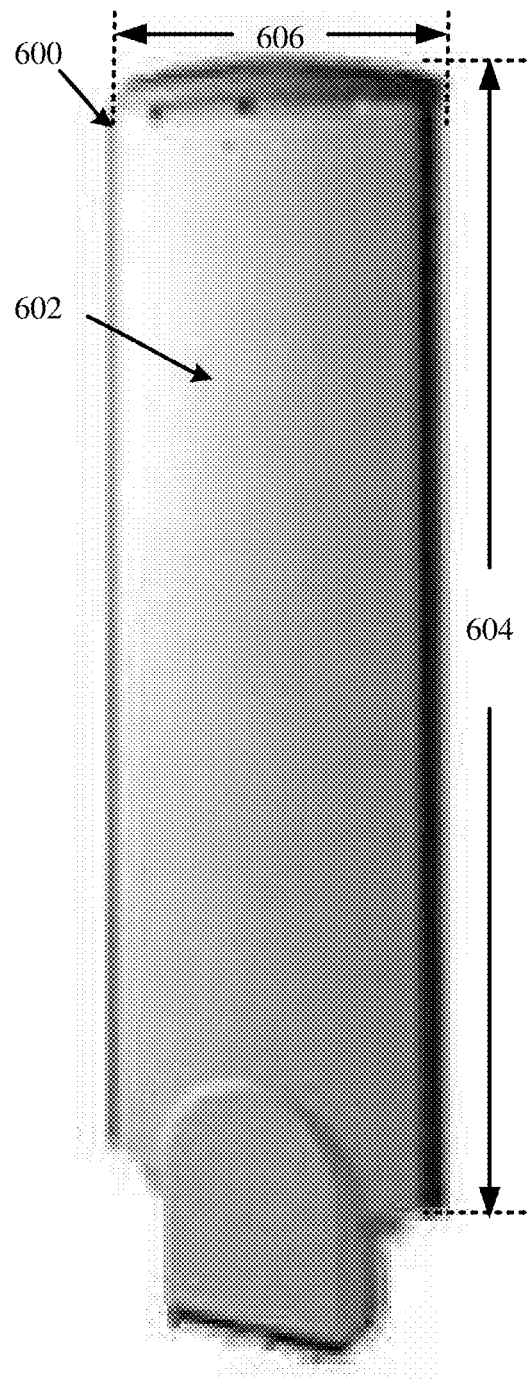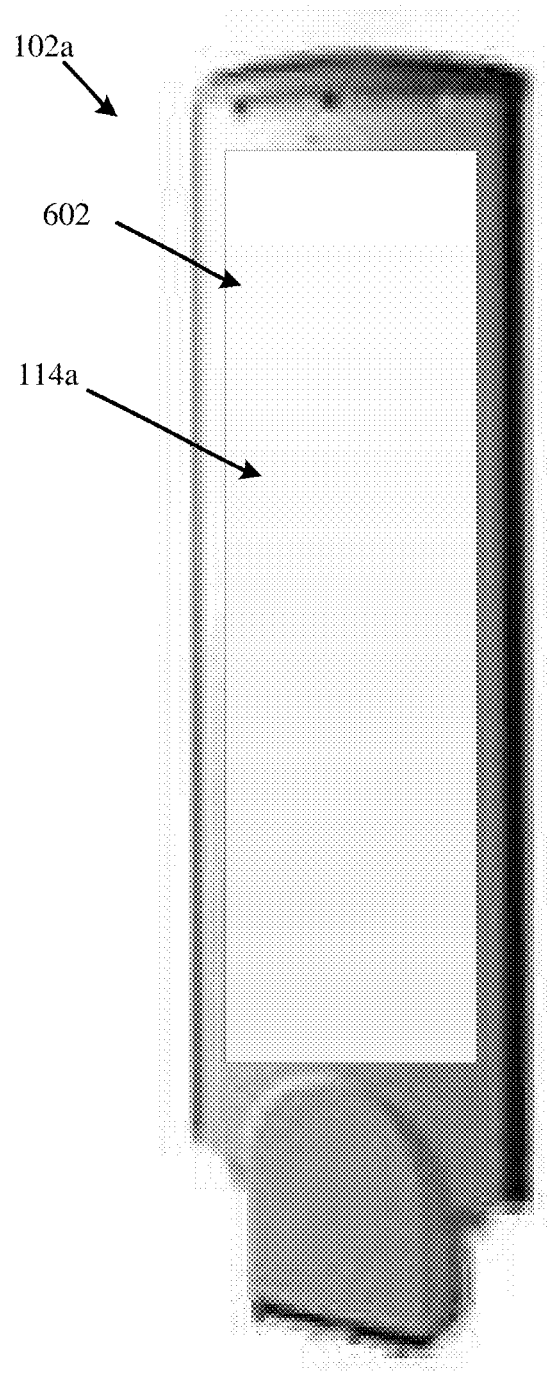
FIG. 6
(Prior Art)
FIG. 7

SHIELDED PEDESTAL WITH SEE-THRU CAPABILITY

CROSS-REFERENCE TO RELATED APPLICATIONS

The present application claims priority to U.S. Patent Ser. No. 62/596,163 filed on Dec. 8, 2017. The forgoing application is incorporated herein in its entirety by reference.

BACKGROUND

Statement of the Technical Field

The present solution relates generally to Electronic Article Surveillance ("EAS") detection systems. More particularly, the present solution relates to shield pedestals with see-thru capability.

Description of the Related Art

EAS detection systems generally comprise an interrogation antenna for transmitting an electromagnetic signal into an interrogation zone, markers which respond in some known electromagnetic manner to the interrogation signal, an antenna for detecting the response of the marker, a signal analyzer for evaluating the signals produced by the detection antenna, and an alarm which indicates the presence of a marker in the interrogation zone. The alarm can then be the basis for initiating one or more appropriate responses depending upon the nature of the facility. Typically, the interrogation zone is in the vicinity of an exit from a facility such as a retail store, and the markers can be attached to articles such as items of merchandise or inventory.

One type of EAS detection system utilizes AcoustoMagnetic ("AM") markers. The general operation of an AM EAS detection system is described in U.S. Pat. Nos. 4,510,489 and 4,510,490, the disclosure of which is herein incorporated by reference. The detection of markers in an AM EAS detection system by pedestals placed at an exit has always been specifically focused on detecting markers only within the spacing of the pedestals. However, the interrogation field generated by the pedestals may extend beyond the intended detection zone. For example, a first pedestal will generally include a main antenna field directed toward a detection zone located between the first pedestal and a second pedestal. When an exciter signal is applied at the first pedestal it will generate an electro-magnetic field of sufficient intensity (or interrogation signal) so as to excite markers (or security tags) within the interrogation or detection zone. Similarly, the second pedestal will generally include an antenna having a main antenna field directed toward the detection zone (and toward the first pedestal). An exciter signal applied at the second pedestal will also generate an electromagnetic field with sufficient intensity (e.g., an interrogation signal) so as to excite markers (or security tags) within the interrogation or detection zone. When a marker tag is excited in the detection zone, it will generate an electromagnetic signal which can usually be detected by receiving the signal at the antennas associated with the first and second pedestal.

One limitation of EAS detection systems is the detection of tagged items in the back-field area behind the pedestal antennas. Tag detection in this area will trigger alarms that are considered false, since the customer carrying the merchandise is not exiting the store. One method used to reduce back-field is to change the antenna's transmit and receive patterns from transceivers (transmit and receive simultaneously) to transmit or receive only. This method is effective in reducing back-field alarms. However, this method reduces the systems performance in the valid detection area. Other methods which compare received amplitudes between multiple antennas have been successful in reducing back-field false alarms. But, these algorithms could be unreliable due to their dependence on noise amplitudes.

It is common knowledge that ideally EAS pedestals should have two distinct characteristics—an open look aesthetic and a limited backfield. At this time, these goals have not been achieved in one product. Attempts have been made at backfield reduction using firmware algorithms, but the results have not been satisfactory for certain retailers with needs to merchandise very close to the backside of the EAS pedestals. Conversely, pedestal shields have been released to the marketplace which provide good backfield reduction, but they are solid and do have the functional open look aesthetic.

SUMMARY

The present disclosure concerns systems and methods for operating a pedestal of an EAS system. The methods comprise: performing tag detection operations by a circuit of a first pedestal to detect an active security tag located in an EAS detection zone of the EAS system; and performing open-look operations by the circuit of the first pedestal simultaneously with the tag detection operations. The open-look operations cause a portion of the first pedestal that is formed of an opaque material (1) to appear at least partially transparent or (2) to appear as if the portion has at least one aperture formed therethrough.

In some scenarios, the first pedestal comprises a shielding layer to prevent detection of an active security tag in a pedestal back-field. The shielding layer has geometric dimensions greater than an antenna of the first pedestal.

In those or other scenarios, the tag detection operations further comprise: attenuating an interrogation signal transmitted from the first pedestal or a second pedestal prior to the interrogation signal reaching a pedestal back-field area; attenuating a response signal generated by an active security tag located in a pedestal back-field area.

In those or other scenarios, the open-look operations may involve: capturing at least one image or video by a camera coupled to a first side of the first pedestal; and displaying the at least one image or video on a display device coupled to a second side opposed from the first side of the first pedestal. The display devices comprise a single display screen or an array of display screens. A shielding layer of the first pedestal resides between the camera and the display device. The shielding layer is configured to reduce a total number of detections of active security tags in a pedestal back-field area. The antenna of the first pedestal also resides between the camera and the display device.

The present disclosure also concerns an EAS pedestal. The EAS pedestal comprises: a processor; and a non-transitory computer-readable storage medium comprising programming instructions that are configured to cause the processor to implement a method for operating the EAS pedestal. The programming instructions comprise instructions to: perform tag detection operations to detect an active security tag located in an EAS detection zone of the EAS pedestal; and perform open-look operations simultaneously with the tag detection operations, where the open-look operations cause a portion of the EAS pedestal that is formed of an opaque material (1) to appear at least partially transparent or (2) to appear as if the portion has at least one aperture formed therethrough.

BRIEF DESCRIPTION OF THE DRAWINGS

The present solution will be described with reference to the following drawing figures, in which like numerals represent like items throughout the figures.

FIG. 6 is a front perspective view of a conventional pedestal.

FIG. 7 is a front perspective view of an illustrative pedestal.

DETAILED DESCRIPTION

Figure 1:
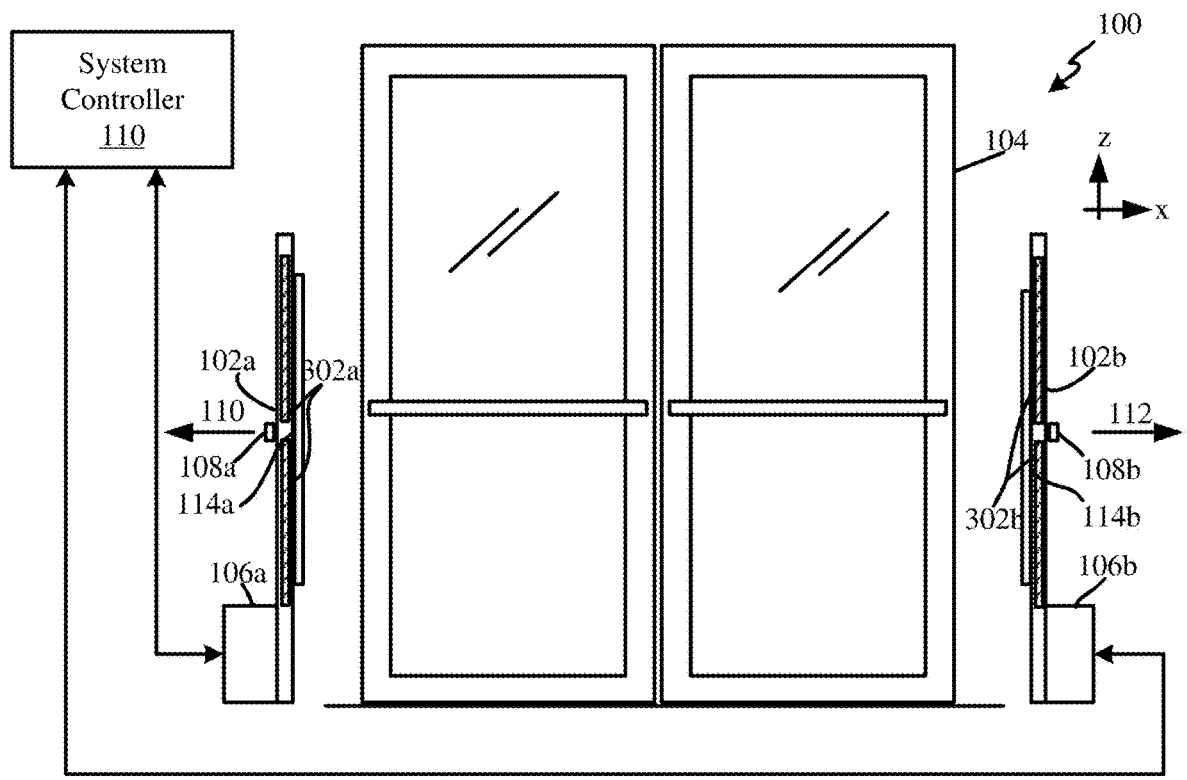
FIG. 1 is a side view of an illustrative EAS detection system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally provides implementing systems and methods for providing backfield reduction in EAS systems while allowing full visibility to the area behind the EAS pedestal(s). The present solution is achieved by displaying images of the area behind a pedestals on at least one display screen coupled to the front of the pedestals. The images are captured by one or more cameras coupled to the back of the pedestal. Using small low profile cameras mounted on the rear of the pedestal and mounting a display or array of displays visible from the front side of the pedestal, images can be displayed on the front side of the pedestal presenting the illusion that the pedestal is "see thru". In reality, the pedestal is opaque due to a shielding material mounted behind the pedestal antenna(s). The shielding material minimizes or eliminated detection of active security tags in pedestal back-field areas. The present solution will be discussed in more detail below.

Figure 2:
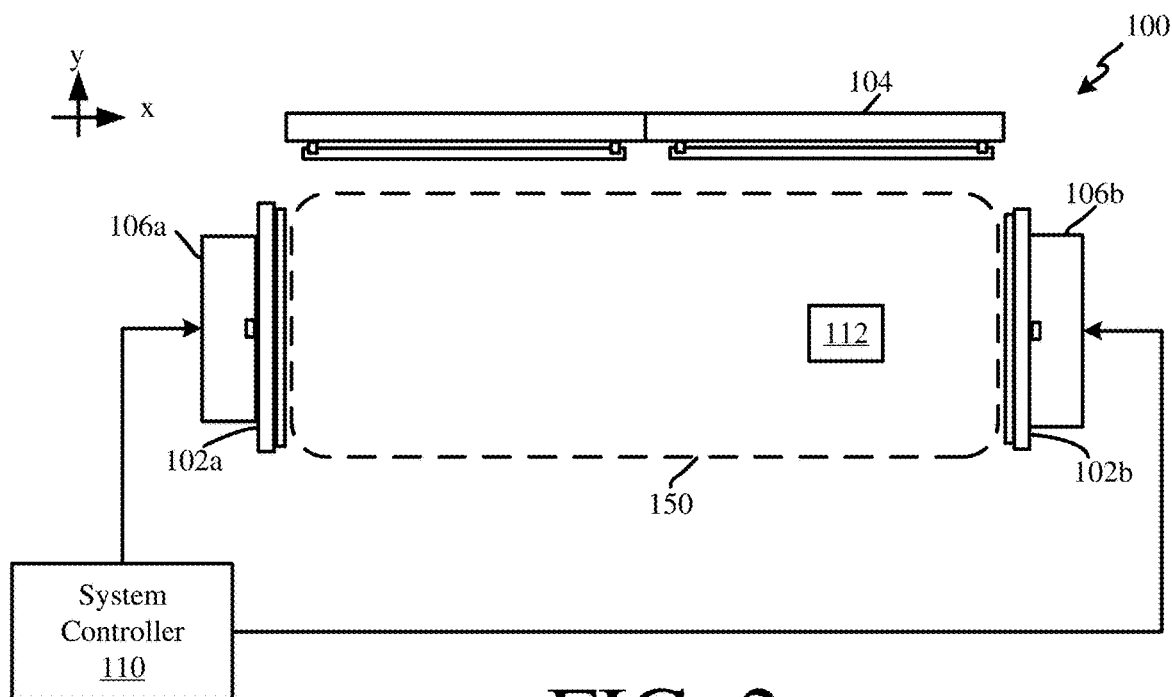
FIG. 2 is a top view of the EAS detection system in FIG. 1, which is useful for understanding an EAS detection zone thereof.

Referring now to FIGS. 1 and 2, an illustrative architecture for an EAS detection system 100 is provided. Notably, the present solution is described herein in terms of an AM EAS detection system. However, the methods of the present solution can also be used in other types of EAS detection systems, including systems that use Radio Frequency ("RF") type tags and Radio Frequency IDentification ("RFID") EAS detection systems.

The EAS detection system 100 will be positioned at a location adjacent to an entry/exit 104 of a secured facility (e.g., a retail store). The EAS detection system 100 uses specially designed EAS marker tags ("security tags") which are applied to store merchandise or other items which are stored within a secured facility. Security tags are well known in the art, and therefore will not be described herein in detail. Any known or to be known security tag can be used herein without limitation. The security tags can be deactivated or removed by authorized personnel at the secure facility. For example, in a retail environment, the security tags could be removed by store employees.

When an active security tag 112 is detected by the EAS detection system 100 in an idealized representation of an EAS detection zone (or interrogation zone) 150 near the entry/exit, the EAS detection system will detect the presence of such security tag and will sound an alarm or generate some other suitable EAS response. Accordingly, the EAS detection system 100 is arranged for detecting and preventing the unauthorized removal of articles or products from controlled areas.

The EAS detection system 100 includes a pair of pedestals 102a, 102b, which are located a known distance apart (e.g., at opposing sides of an entry/exit 104). The pedestals 102a, 102b are typically stabilized and supported by a base 106a, 106b. The pedestals 102a, 102b will each generally include one or more antennas that are suitable for aiding in the detection of the special EAS security tags, as described herein. For example, pedestal 102a can include at least one antenna 302 suitable for transmitting or producing an electromagnetic exciter signal field (or interrogation signal) and receiving response signals generated by active security tags in the EAS detection zone 150. In some scenarios, the same antenna can be used for both receive and transmit functions. Similarly, pedestal 102b can include at least one antenna 402 suitable for transmitting or producing an electromagnetic exciter signal field (or interrogation signal) and receiving response signals generated by security tags in the EAS detection zone 150. The antennas provided in pedestals 102a, 102b can be conventional conductive wire coil or loop designs as are commonly used in AM type EAS pedestals. These antennas will sometimes be referred to herein as exciter coils. In some scenarios, a single antenna can be used in each pedestal. The single antenna is selectively coupled to the EAS receiver. The EAS transmitter is operated in a time multiplexed manner. However, it can be advantageous to include two antennas (or exciter coils) in each pedestal as shown in FIG. 1, with an upper antenna positioned above a lower antenna.

The antennas located in the pedestals 102a, 102b are electrically coupled to a system controller 110. The system controller 110 controls the operation of the EAS detection system 100 to perform EAS functions as described herein. The system controller 110 can be located within a base 106a, 106b of one of the pedestals 102a, 102b or can be located within a separate chassis at a location nearby to the pedestals. For example, the system controller 110 can be located in a ceiling just above or adjacent to the pedestals 102a, 102b.

As noted above, the EAS detection system comprises an AM type EAS detection system. As such, each antenna is used to generate an Electro-Magnetic ("EM") field which serves as a security tag exciter signal. The security tag exciter signal (or interrogation signal) causes a mechanical oscillation of a strip (e.g., a strip formed of a magnetostrictive or ferromagnetic amorphous metal) contained in a security tag within an EAS detection zone 150. As a result of the stimulus signal, the security tag will resonate and mechanically vibrate due to the effects of magnetostriction. This vibration will continue for a brief time after the stimulus signal (or interrogation signal) is terminated. The vibration of the strip causes variations in its magnetic field, which can induce an AC signal in the receiver antenna. This induced signal is used to indicate a presence of the strip within the EAS detection zone (or interrogation zone) 150. As noted above, the same antenna contained in a pedestal 102a, 102b can serve as both the transmit antenna and the receive antenna. Accordingly, the antennas in each of the pedestals 102a, 102b can be used in several different modes to detect a security tag exciter signal. These modes will be described below in further detail.

Figure 3:
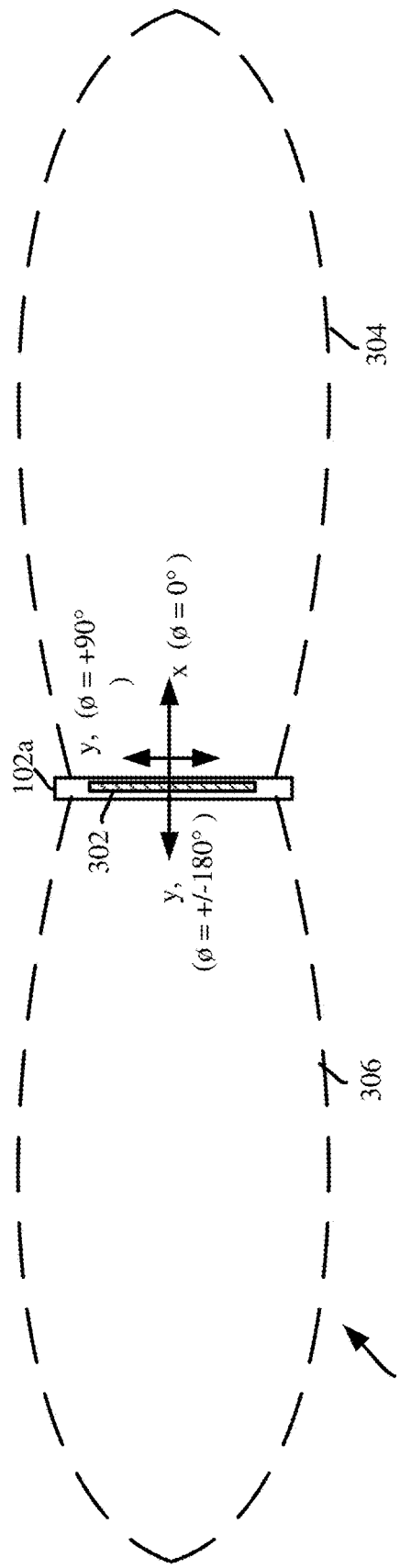
FIGS. 3 and 4 are drawings which are useful for understanding a main field and a back-field of antennas which are used in the EAS detection system of FIG. 1.
Figure 4:
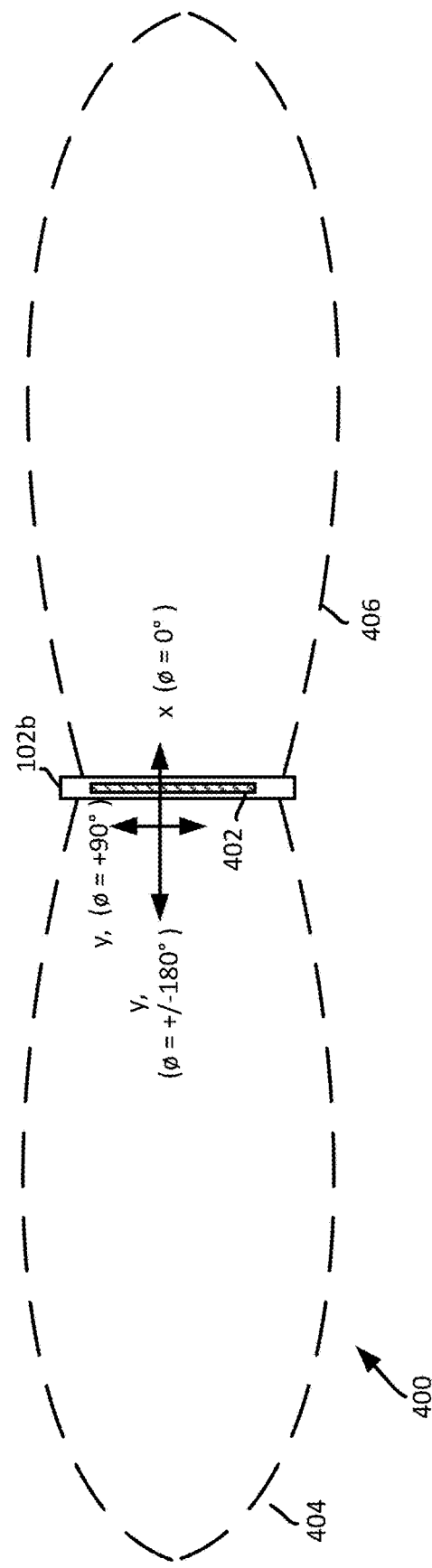

Referring now to FIGS. 3 and 4, there are shown exemplary antenna field patterns 300, 400 for antennas 302, 402 contained in pedestals 102a, 102b. As is known in the art, an antenna radiation pattern is a graphical representation of the radiating (or receiving) properties for a given antenna as a function of space. The properties of an antenna are the same in a transmit mode and a receive mode of operation. As such, the antenna radiation pattern shown is applicable for both transmit and receive operations as described herein. The exemplary antenna field patterns 300, 400 shown in FIGS. 3-4 are azimuth plane patterns representing the antenna pattern in the x, y coordinate plane. The azimuth pattern is represented in polar coordinate form and is sufficient for understanding the inventive arrangements. The azimuth antenna field patterns shown in FIGS. 3-4 are a useful way of visualizing the direction in which the antennas 302, 402 will transmit and receive signals at a particular transmitter power level.

Figure 5:
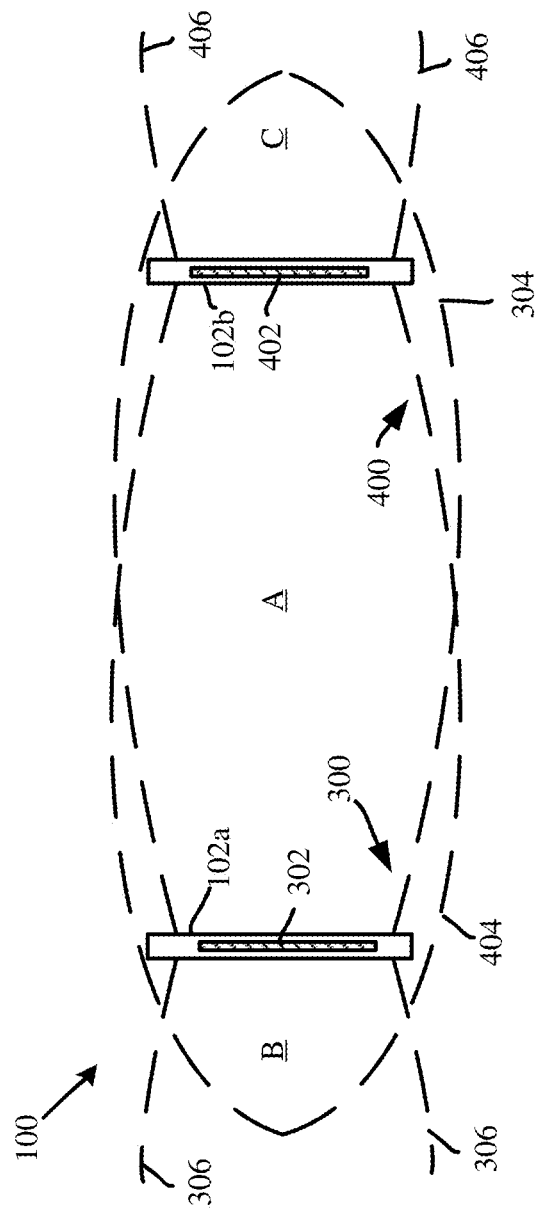
FIG. 5 is a drawing which is useful for understanding a detection zone in the EAS detection system of FIG. 1.

The antenna field pattern 300 shown in FIG. 3 includes a main lobe 304 with a peak at ϕ=0° and a back-field lobe 306 with a peak at angle ϕ=180°. Conversely, the antenna field pattern 400 shown in FIG. 4 includes a main lobe 404 with its peak at ϕ=180° and a back-field lobe 406 with a peak at angle ϕ=0°. In the EAS detection system 100, each pedestal 102a, 102b is positioned so that the main lobe of an antenna contained therein is directed into the EAS detection zone (or interrogation zone) 150. Accordingly, a pair of pedestals 102a, 102b in the EAS detection system 100 will produce overlap in the antenna field patterns 300, 400, as shown in FIG. 5. Notably, the antenna field patterns 300, 400 shown in FIG. 5 are scaled for purposes of understanding the present solution. In particular, the patterns show the outer boundary or limits of an area in which an exciter signal of particular amplitude applied to antennas 302, 402 will produce a detectable response in an EAS security tag. However, it should be understood that a security tag within the bounds of at least one antenna field pattern 300, 400 will generate a detectable response when stimulated by an exciter signal.

The overlapping antenna field patterns 300, 400 in FIG. 5 will include an area A where there is overlap of main lobes 304, 404. However, it can be observed in FIG. 5 that there can also be some overlap of a main lobe of each pedestal with a back-field lobe associated with the other pedestal. For example, it can be observed that the main lobe 404 overlaps with the back-field lobe 306 within an area B. Similarly, the main lobe 304 overlaps with the back-field lobe 306 in an area C. Area A between pedestals 102a, 102b defines the EAS detection zone 150 in which active security tags should cause the EAS detection system 100 to generate an alarm response. Security tags in area A are stimulated by energy associated with an exciter signal within the main lobes 304, 404 and will produce a response which can be detected at each antenna. The response produced by a security tag in area A is detected within the main lobes of each antenna and processed in the system controller 110. Notably, a security tag in areas B or C will also be excited by the antennas 302, 402. The response signal produced by a security tag in these areas B and C will also be received at one or both antennas. This response signal is referred to herein as a "security tag signal".

Referring again to FIGS. 1-2, at least one camera 108a, 108b is advantageously mounted on the back of each pedestal 102a or 102b. Cameras are well known in the art, and therefore will not be described herein. Any known or to be known camera can be used herein without limitation. Still, it should be understood that each camera 108a, 108b is generally configured to capture images of the area behind the respective pedestal. This area is inclusive of the back-field areas B or C shown in FIG. 5.

Each camera 108a, 108b is shown as being located in the middle of the vertically elongate pedestals. The presents solution is not limited in this regard. The camera can be located at any location on the respective pedestal in accordance with a given application. For example, the camera is located at the top center of the pedestal. Additionally, more than one camera can be provided with each pedestal. The total number of cameras on each pedestal is selected in accordance with a given application.

At least one display device 114a, 114b is advantageously mounted on the front of each pedestal 102a or 102b. Display devices are well known in the art, and therefore will not be described herein. Any known or to be known display device (e.g., TV, smart screen, and/or computer based display screen) can be used herein without limitation. Still, it should be understood that each display device 114a, 114b is generally configured to display images capture by the camera 108a, 108b. The images provide representations of the area behind the respective pedestal. This area is inclusive of the backfield areas B or C shown in FIG. 5. The displayed images provide onlookers with the illusion that the pedestal is "see thru", when in reality the pedestal is formed of a solid material which is opaque (i.e., can be seen through).

Each display device 114a, 114b is shown as being located in the middle of the vertically elongate pedestals. The presents solution is not limited in this regard. The display device can be located at any location on the respective pedestal in accordance with a given application. For example, the display device is located at the top center of the pedestal. Additionally, more than one display device can be provided with each pedestal. The total number of display devices on each pedestal is selected in accordance with a given application.

Referring now to FIG. 6, there is provided a front perspective view of conventional pedestal 600. Pedestal 600 comprises sidewalls 602 formed of an opaque solid material (e.g., plastic). As such, onlookers are unable to see what is behind the pedestal. The present solution is not limited to the pedestal architecture of FIG. 6. In some scenarios, at least a portion of the pedestal is formed of a transparent material and/or has an aperture formed therethrough.

Referring now to FIG. 7, there is provided a front perspective view of pedestal 102a designed in accordance with the present solution. Pedestal 102b is the same as or similar to pedestal 102a. As such, the following discussion of pedestal 102a is sufficient for understanding pedestal 102b.

As shown in FIG. 7, the display device 114a is disposed on a front sidewall 602 of the pedestal 102a. The display device 114a can comprise a single display screen as shown, or alternatively an array of a plurality of display screens. Operations of the display device 114a are controlled by the system controller 110. For example, the display device 114a is controlled to display images or videos captured by camera 108a in real time or near real time. In effect, the pedestal 102a appears to be formed of a transparent material, rather than a solid opaque material.

Figure 8:
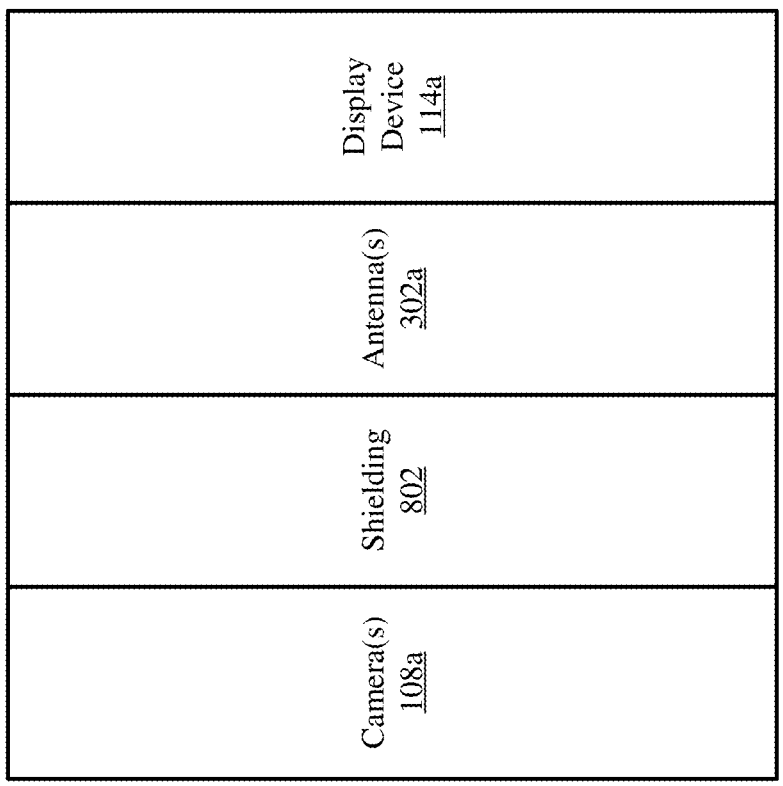
FIG. 8 is an illustration of an illustrative layer configuration for a pedestal.

Referring now to FIG. 8, there is provided an illustration of an illustrative configuration of the components within the combined pedestal assembly 102a. The housing of the pedestal is not shown for ease of discussion. The components include, but are not limited to, the camera(s) 108a, the shielding 802, the antenna(s) 302a, and/or the display device 114a. The shielding 802 provides a way to minimize or eliminate the EAS system's detection of active security tags in the back-field area (e.g., areas B and/or C of FIG. 5. The shielding 802 is sized and shaped to have the same or slightly larger geometric dimensions (i.e., length 606 and height 604) as other components of the pedestal 102a (e.g., the antennas). The shielding 802 is formed of a material suitable for attenuating (or reduce in strength) interrogation signals transmitted from the pedestal (or the magnetic field generated by the pedestal's transmitter) in the direction towards a pedestal's back-field area (e.g., area B and/or C of FIG. 5) and/or attenuating (or reduce in strength) response signals transmitted from active security tags located in the back-field of the pedestal. This attenuation results in the minimization or elimination of active security tag detection in the pedestal(s) back-field. The material includes, but is not limited to, carbon steel, cold rolled steel, and/or aluminum.

The antenna(s) 302a can include, but is not limited to, air core coils, ferrite core antenna(s), iron core antenna(s), and/or patch antenna(s). The antenna(s) 302 can additionally or alternative be designed to detect magnets. For example, a magnet sensing apparatus is provided inside an antenna coil. The present solution is not limited to the particulars of this example.

Figure 9:
FIG. 9 is an illustration of another illustrative layer configuration for a pedestal.

The present solution is not limited to this configuration of FIG. 8. An alternative illustrative configuration is shown in FIG. 9. In FIG. 9, the display device 904 resides between the shielding 902 and antenna(s) 906, rather than in front of both as shown in FIG. 8.

Figure 10:
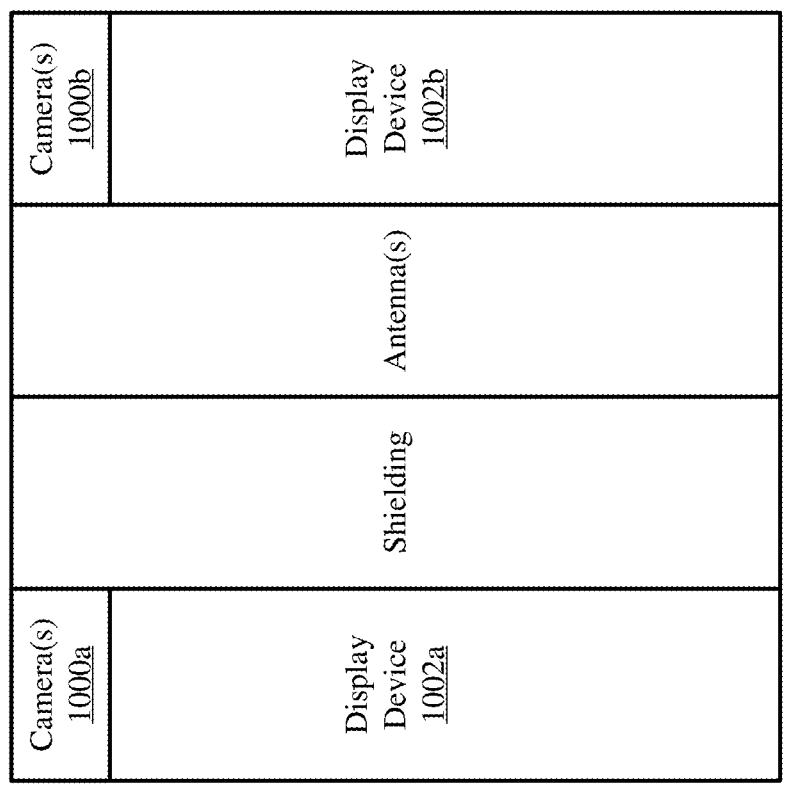
FIG. 10 is an illustration of another illustrative layer configuration for a pedestal.

FIG. 10 shows another alternative configuration. In FIG. 10, a camera 1000a, 1000b and display device 1002a, 1002b are disposed on both sides of the pedestal. Accordingly, the pedestal appears transparent when on onlooker is viewing the pedestal from the back and/or front.

The present solution is not limited to the configurations shown in FIGS. 8-10. In those or other scenarios, the pedestal can be designed such that it additionally or alternatively appears transparent from any viewing angle.

Figure 11:
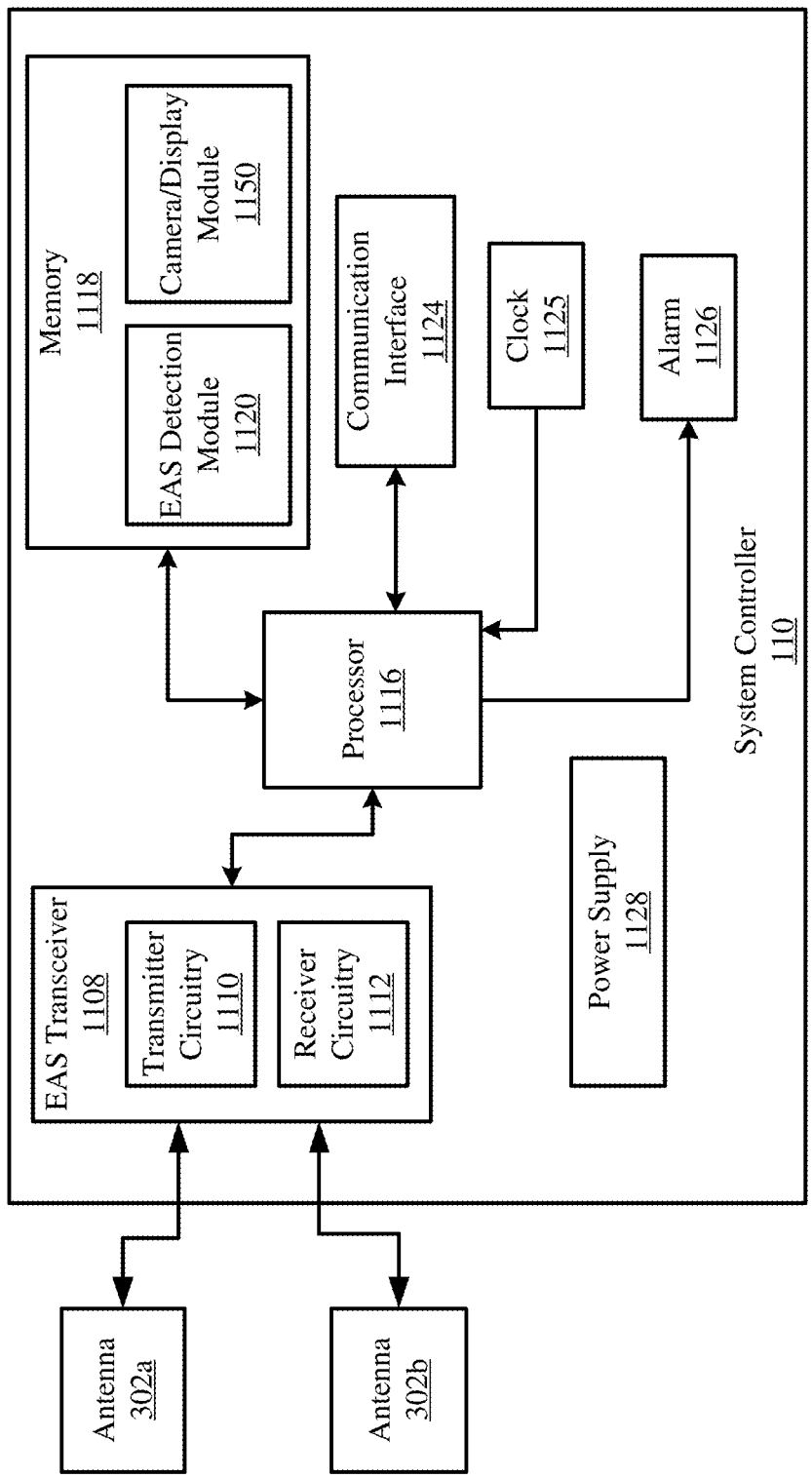
FIG. 11 is a block diagram of the system controller shown in FIGS. 1-2.

Referring now to FIG. 11, there is provided a block diagram that is useful for understanding the arrangement of the system controller 110. The system controller comprises a processor 1116 (such as a micro-controller or Central Processing Unit ("CPU")). The system controller also includes a computer readable storage medium, such as memory 1118 on which is stored one or more sets of instructions (e.g., software code) configured to implement one or more of the methodologies, procedures or functions described herein. The instructions (i.e., computer software) can include an EAS detection module 1120 to facilitate EAS detection and perform methods for selectively issuing an alarm based on a detected location of an EAS security tag, as described herein. The instructions can also include a camera/display module 1150 to (a) cause images/videos to be captured by at least one camera mounted to the back or rear of a pedestal and (b) cause the images/videos to be displayed on display device(s) mounted to the front of the pedestal. These instructions can also reside, completely or at least partially, within the processor 1116 during execution thereof.

The system also includes at least one EAS transceiver 1108, including transmitter circuitry 1110 and receiver circuitry 1112. The transmitter and receiver circuitry are electrically coupled to antenna 302a and the antenna 302b. A suitable multiplexing arrangement can be provided to facilitate both receive and transmit operation using a single antenna (e.g. antenna 302a or 302b). Transmit operations can occur concurrently at antennas 302a, 302b after which receive operations can occur concurrently at each antenna to listen for marker tags which have been excited. Alternatively, transmit operations can be selectively controlled as described herein so that only one antenna is active at a time for transmitting security tag exciter signals for purposes of executing the various algorithms described herein. The antennas 302a, 302b can include an upper and lower antenna similar to those shown and described with respect to FIG. 1. Input exciter signals applied to the upper and lower antennas can be controlled by transmitter circuitry 1110 or processor 1116 so that the upper and lower antennas operate in a phase aiding or a phase opposed configuration as required.

Additional components of the system controller 110 can include a communication interface 1124 configured to facilitate wired and/or wireless communications from the system controller 110 to a remotely located EAS system server. The system controller can also include a real-time clock 1125 which is used for timing purposes, and an alarm 1126 (e.g. an audible alarm, a visual alarm, or both) which can be activated when an active EAS security tag is detected within the EAS detection zone 108. A power supply 1128 provides necessary electrical power to the various components of the system controller 110. The electrical connections from the power supply to the various system components are omitted in FIG. 11 so as to avoid obscuring the present solution.

Those skilled in the art will appreciate that the system controller architecture illustrated in FIG. 11 represents one possible example of a system architecture that can be used with the present solution. However, the present solution is not limited in this regard and any other suitable architecture can be used in each case without limitation. Dedicated hardware implementations including, but not limited to, application-specific integrated circuits, programmable logic arrays, and other hardware devices can likewise be constructed to implement the methods described herein. It will be appreciated that the apparatus and systems of various inventive embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Figure 12:
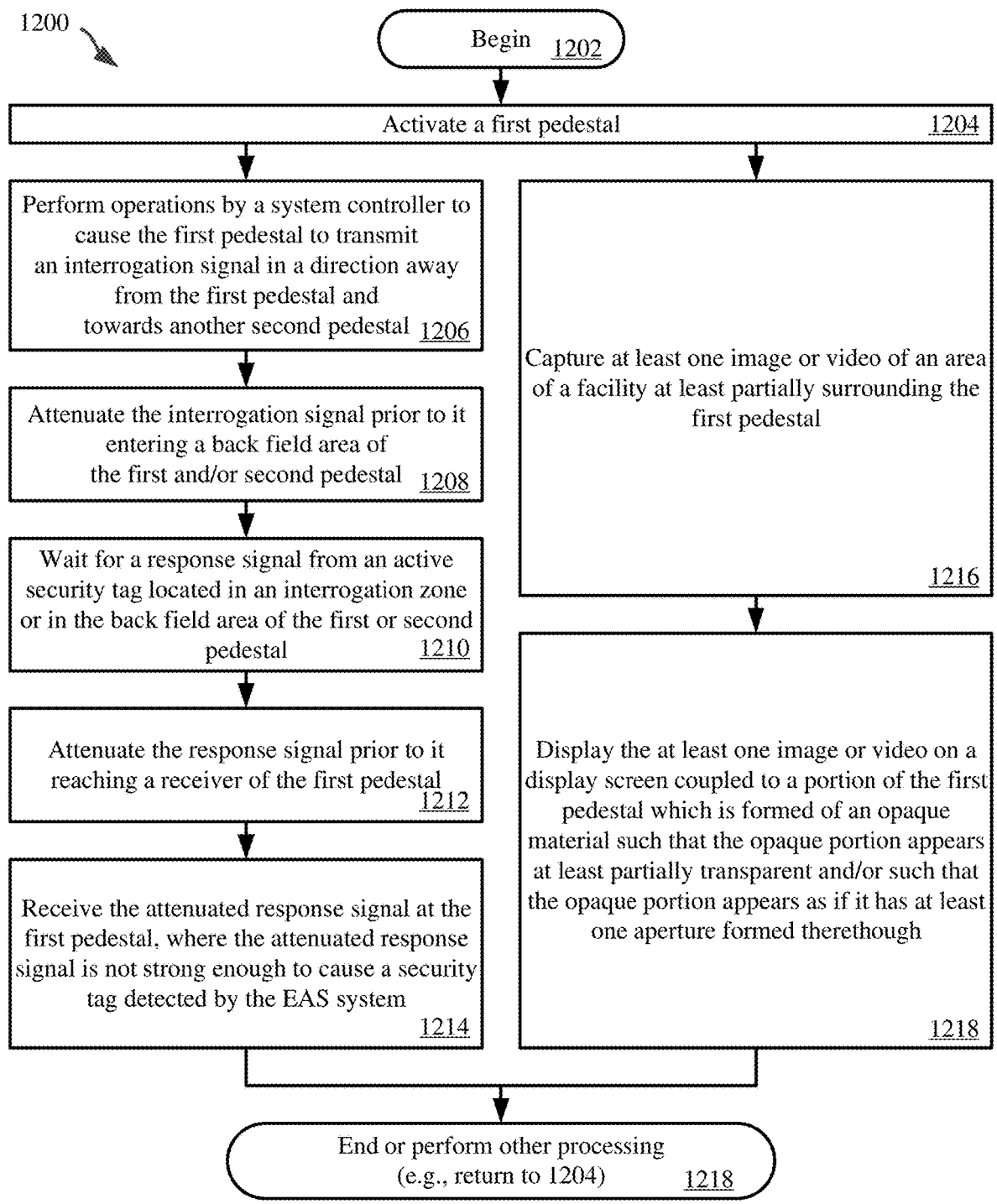
FIG. 12 is a flowchart of an illustrative method for operating a pedestal of an EAS system.

Referring now to FIG. 12, there is provided a flow diagram of an illustrative method 1200 for operating a pedestal of an EAS system. Method 1200 begins with 1202 and continues with 1204 where a first pedestal (e.g., pedestal 102a of FIG. 1) is activated. Next, tag detection operations 1206-1214 of the first pedestal are performed simultaneously with open-look operations 1216-1218 of the first pedestal.

Tag detection operations of EAS systems and EAS pedestals are well known in the art, and therefore are not described in detail herein. Any known or to be known tag detection operations can be employed herein without limitation. For example, in some scenarios, the tag detection operations 1206-1214 involve: performing operations by a system controller (e.g., system controller 110 of FIG. 1) to cause the first pedestal to transmit an interrogation signal in a direction away from the first pedestal and towards another second pedestal (e.g., pedestal 102b of FIG. 1); attenuating the interrogation signal prior to it entering or traveling into a back-field area (e.g., area B and/or C of FIG. 5) of the first and/or second pedestal; waiting for a response signal from an active security tag located in an interrogation zone (e.g., EAS detection zone 150 of FIG. 2) or in a back-field area of the first or second pedestal; attenuating the response signal prior to it reaching a receiver (e.g., antenna 302b and/or receiver circuitry 1112 of FIG. 11) of the first pedestal; and receiving the attenuated response signal at the first pedestal. Notably, the attenuated response signal is not strong enough to cause the EAS system (e.g., EAS system 100 and/or system controller 110 of FIG. 1) to detect an active security tag located in the back-field area of the first and/or second pedestal.

The open-look operations 1216-1218 involve: capturing at least one image or video of an area of a facility at least partially surrounding the first pedestal; and displaying the at least one image or video on a display screen coupled to a portion of the first pedestal which is formed of an opaque material such that the opaque portion appears at least partially transparent and/or such that the opaque portion appears as if it has at least one aperture formed therethrough.

Upon completing the tag detection operations 1206-1214 and the open-look operations 1216-1218, method 1200 continues with 1218. In 1218, method 1200 ends or other processing is performed. The other processing can include, but is not limited to, returning to 1204 so that the process is repeated.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a pedestal of an Electronic Article Surveillance ("EAS") system, comprising:
    performing tag detection operations by a circuit of a first pedestal to detect an active security tag located in an EAS detection zone of the EAS system; and
    performing open-look operations by the circuit of the first pedestal simultaneously with the tag detection operations, where the open-look operations cause a portion of the first pedestal that is formed of an opaque material (1) to appear at least partially transparent or (2) to appear as if the portion has at least one aperture formed therethrough.

2. The method according to claim 1, wherein the first pedestal comprises a shielding layer to prevent detection of an active security tag in a pedestal back-field.

3. The method according to claim 2, wherein the shielding layer has geometric dimensions greater than an antenna of the first pedestal.

4. The method according to claim 1, wherein the tag detection operations further comprise attenuating an interrogation signal transmitted from the first pedestal or a second pedestal prior to the interrogation signal reaching a pedestal back-field area.

5. The method according to claim 1, wherein the tag detection operations further comprise attenuating a response signal generated by an active security tag located in a pedestal back-field area.

6. The method according to claim 1, wherein the open-look operations involve capturing at least one image or video by a camera coupled to a first side of the first pedestal.

7. The method according to claim 6, wherein the open-look operations involve displaying the at least one image or video on a display device coupled to a second side opposed from the first side of the first pedestal.

8. The method according to claim 7, wherein the display devices comprise a single display screen or an array of display screens.

9. The method according to claim 8, wherein a shielding layer of the first pedestal resides between the camera and the display device, the shielding layer configured to reduce a total number of detections of active security tags in a pedestal back-field area.

10. The method according to claim 9, wherein at least one antenna of the first pedestal also resides between the camera and the display device.

11. An Electronic Article Surveillance ("EAS") pedestal, comprising:
   a processor; and
   a non-transitory computer-readable storage medium comprising programming instructions that are configured to cause the processor to implement a method for operating the EAS pedestal, wherein the programming instructions comprise instructions to:
      perform tag detection operations to detect an active security tag located in an EAS detection zone of the EAS pedestal; and
      perform open-look operations simultaneously with the tag detection operations, where the open-look operations cause a portion of the EAS pedestal that is formed of an opaque material (1) to appear at least partially transparent or (2) to appear as if the portion has at least one aperture formed therethrough.

12. The EAS pedestal according to claim 11, wherein the EAS pedestal comprises a shielding layer to prevent detection of an active security tag in a pedestal back-field.

13. The EAS pedestal according to claim 12, wherein the shielding layer has geometric dimensions greater than an antenna of the EAS pedestal.

14. The EAS pedestal according to claim 11, wherein the tag detection operations further comprise attenuating an interrogation signal transmitted from the EAS pedestal or another EAS pedestal prior to the interrogation signal reaching a pedestal back-field area.

15. The EAS pedestal according to claim 11, wherein the tag detection operations further comprise attenuating a response signal generated by an active security tag located in a pedestal back-field area.

16. The EAS pedestal according to claim 11, wherein the open-look operations involve capturing at least one image or video by a camera coupled to a first side of the EAS pedestal.

17. The EAS pedestal according to claim 16, wherein the open-look operations involve displaying the at least one image or video on a display device coupled to a second side opposed from the first side of the EAS pedestal.

18. The EAS pedestal according to claim 17, wherein the display device comprises a single display screen or an array of display screens.

19. The EAS pedestal according to claim 18, wherein at least one antenna of the EAS pedestal also resides between the camera and the display device.

20. The EAS pedestal according to claim 17, wherein a shielding layer of the EAS pedestal resides between the camera and the display device, the shielding layer configured to reduce a total number of detections of active security tags in a pedestal back-field area.

* * * * *